Figure 1:
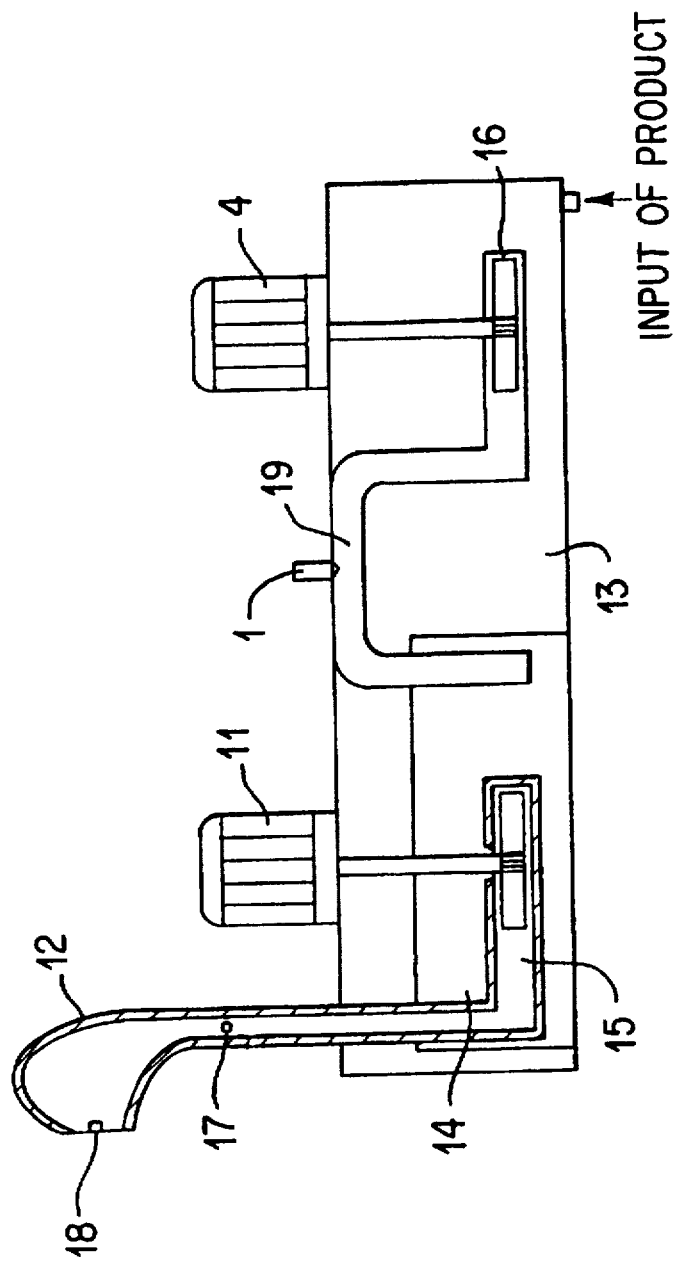

United States Patent [19]

Schroeder

[11] Patent Number: 5,794,668
[45] Date of Patent: Aug. 18, 1998

[54] FILLING STREAM ADJUSTING PROCESS

[75] Inventor: Wolfgang Schroeder, Magdeburg, Germany

[73] Assignee: Afuema Abfuellmaschinen GmbH Rosslau, Rosslau, Germany

[21] Appl. No.: 732,415

[22] PCT Filed: Feb. 20, 1996

[86] PCT No.: PCT/DE96/00337

§ 371 Date: Oct. 22, 1996

§ 102(e) Date: Oct. 22, 1996

[87] PCT Pub. No.: WO96/26110

PCT Pub. Date: Aug. 29, 1996

[30] Foreign Application Priority Data

Feb. 22, 1995 [DE] Germany .................. 195 07 831.4

[51] Int. Cl.⁶ .................. B65B 1/30; B65B 3/28; B65B 57/06; B65B 57/14

[52] U.S. Cl. .................. 141/198; 141/1; 141/67; 141/192; 141/324; 222/64; 417/43; 73/116; 73/149

[58] Field of Search .................. 141/1, 2, 67, 95, 141/153, 156, 192, 198, 324; 222/59, 63, 64; 417/43; 73/1.16, 149, 290 R

[56] References Cited

U.S. PATENT DOCUMENTS 4,460,026  7/1984  Hurley .................. 141/1

5,316,444  5/1994  Wicnienski .................. 417/2

FOREIGN PATENT DOCUMENTS

| 0426266 | 5/1991 | European Pat. Off. . |
| 0444269 | 9/1991 | European Pat. Off. . |
| 297123  | 1/1992 | Germany . |
| 9202787 | 2/1992 | WIPO . |

*Primary Examiner*—Henry J. Recla
*Assistant Examiner*—Timothy L. Maust
*Attorney, Agent, or Firm*—Jordan and Hamburg

[57] ABSTRACT

A procedure for adjusting a filling jet of flow-controlled automatic filler machines. The task is of providing an inventive solution, ensuring an even, clean supply of the medium volume flow via the filling pipe into the container. The task is solved by determining and storing the speed of a filling jet emerging from a filling pipe. The actual speed values of a volume flow emerging from a pump is measured with a speed sensor and the thus gained values are compared in order to adjust the speed of an emerging filler jet. At the same time the flow output of the pump is changed until the stored set value of the filler jet speed at the volume sensor corresponds to the speed of the medium volume flow measured at the speed sensor. Only then the filling process into the vessels is started.

9 Claims, 4 Drawing Sheets

FILLING STREAM ADJUSTING PROCESS

The invention refers to a procedure for adjusting a filling jet of flow-controlled automatic filling machines used for dosing liquids of various viscosities and densities and filling these with a free-flowing, directed filling jet into vessels.

A procedure is known in which liquids of various viscosities and densities are dosed and filled into containers by volume-controlled automatic fillers. U.S. Pat. No. 4,460,026 shows a liquid measuring method, using a liquid filling device, containing several reservoir elements in certain positions. These reservoir elements are formed from body and neck parts and connect to a container outlet pipe. The procedure according to U.S. Pat. No. 4,460,026 has the disadvantage that dosing and measuring procedures are carried out in a separate part of the device, causing high measuring inaccuracies due to transmission errors. A further, significant disadvantage of flow-controlled automatic fillers, is the time-dependent filling program. The time-dependency of the filling program, i.e. the presetting of the filling time, irrespective of the viscosity and density combined with the changes occurring during the filling process, ad to significant dosing errors, which either have to be corrected by continuous readjustment of the filling, time or by a subsequent complete filling or the vessels. Once the dosing and measuring process is interrupted, a subsequent adjustment of the time program is necessary until the required amount has been set. DD PS 297 123 shows a sensor arrangement in which sensors are arranged on the filling pipe at certain intervals, allowing a measurement of the basic volume. The evaluation of the operating time difference is used for compensating viscosity influences. A disadvantage of the device required for implementing the procedure is that the speed of the medium to be filled can vary considerably in the device, depending on the viscosity and shear rate. In case of the speed of the filling jet emerging from the filling pipe being too high, the filling jet flows past instead of into the vessel opening. In case of the speed being too low, the filling jet is too weak and the medium runs down the filling pipe or the container. A further disadvantage of this arrangement is that the overflow arrangement required for an even dosing is not filled continuously, causing dosing errors. The arrangement of DD PS 297 123 has the further disadvantage of the pump motors being switched off after completing the filling process, causing the medium to adopt a resting position and to change its viscosity. Upon restarting the pump motors and the dosing, considerable adjustments are required to achieve a continuous dosing accuracy.

The invention has the task of providing a procedure according to the characterizing clause of claim 1, achieving an even, clean supply of the medium volume flow through the filling pipe into the containers consisting of vessels.

According to the invention, the task is solved by determining the speed of the liquid jet emerging from the filling pipe as a set value and storing this value in a computer. The actual speed values of a volume flow emerging from a pump are then compared with the stored set values, to adjust the speed of a filling jet emerging from the filling pipe in the region of an external volume sensor. The actual values of the volume flow are determined by speed sensors arranged in front of internal speed sensors but behind the pumps. The output of the respective pump is changed until the value of the stored set value of the filling jet speed corresponds to the measured volume flow speed. Only then is the dosing and filling process via the volume sensors started. The invention is advantageous if a continuous measuring of the flow speed of the volume flow Q emerging from the leveling pump is carried out whilst maintaining a full filling medium tank and an overflowing leveling container, with the consistency of overfilling being regulated by the comparison of the actual volume flow value with a determined set value from which the leveling pump receives a control signal for changing its speed and consequently its output. The speed $X_{qv}$ of the volume flow Q is continuously measured by a sensor positioned on the pressure pipe of the leveling pump and compared with an analogue value of the set speed. The analogue value is issued as a signal from the control to a frequency converter of the leveling pump drive to decrease or increase the speed of the leveling pump, resulting in a change of flow speed. According to the invention the signal for changing the speed and consequently the output of the pump should ideally be issued to the frequency converter in form of an analogue signal. In a further ideal embodiment of the invention and with the filling medium not having a shear ratio, the level control in the buffer container and the maintenance of a constant filling level are carried out by a contactless speed sensor, continually sensing the buffer container. The sensor passes the actual values of the volume flow speed to a comparison with the set values, and triggers a control pulse, upon detecting a deviation in value, changing the pump speed as well as the output quantity and speed, according to the filling level of the container. According to an embodiment of a solution provided by the invention, a control pulse is triggered after determining a value deviation, causing the opening of an assigned valve outlet to be modified for changing the filling level of the container. The invention is characterized in that the height of the filling level of the leveling container is measured by a speed sensor arranged on a filling pipe which is activated by a speed difference of the volume flow Q to the set value. As part of a characteristic of the invention the sensor, being an analogue speed sensor, carries out a comparison of the measured value of the flow speed $Q_v$ and the set value $W_{qv}$ after measuring the flow speed $Q_v$ of the volume flow Q in the assigned analogue controller, after which a regulated quantity $U_{qv}$ is issued as a permanent signal and is adapted to the set value of the flow speed to maintain a constant speed and output of the pump drive. The invention is furthermore characterized by the filling medium being continuously repumped between the buffer container and leveling container in an adapted interval before the filling process and during filling breaks in order to change the viscosity of the filling medium and to maintain an even constancy of the filling medium. According to a further embodiment it is advantageous that in order to maintain a constant viscosity and in case of a known final value of the filling medium's shear ratio, the pump drive or the filling pump is kept moving without, however, pumping any liquid.

The invention is explained below with an example and reference to associated figures in which:

FIG. 1: Shows the implementation or the procedure with an automatic filler during the filling of a medium with a shear ratio.

Figure 2:
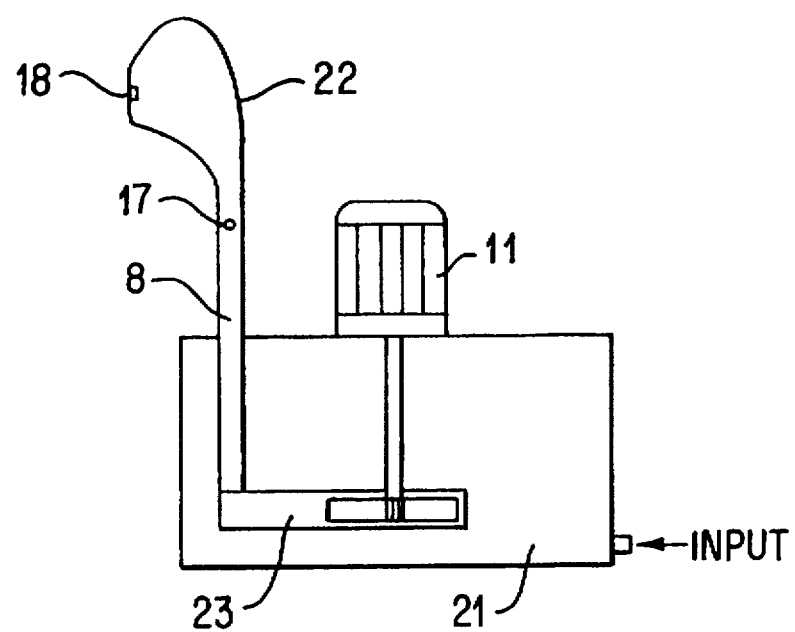

FIG. 2: Shows the implementation of the procedure with an automatic filler during the filling of a medium without a shear ratio FIG. 3: Shows an illustration of the procedural sequence according to FIG. 1.

Figure 4:
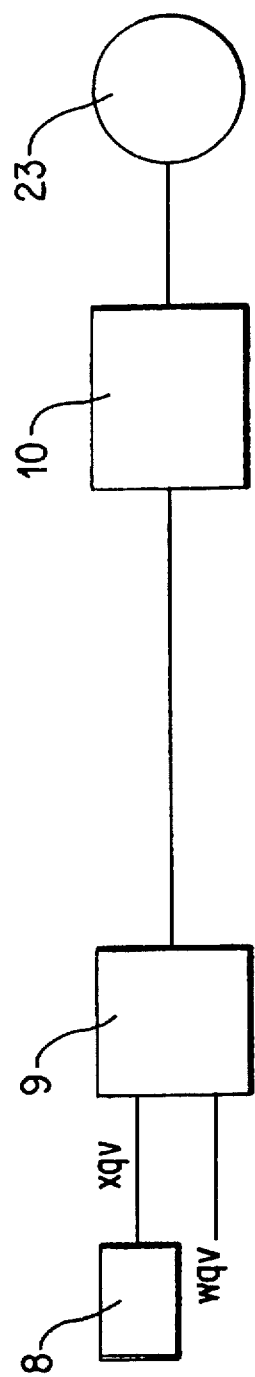

FIG. 4: Shows an illustration of the procedural sequence according to FIG. 2.

FIG. 1 shows an automatic filler comprising a buffer container 13, a leveling container 14, a leveling pump 16 with a connected pressure pipe 19 formed at the base of the container 14, a filling pump 15 with a connected and rising filling pipe 12, on which two volume sensors 17; 18 are arranged. The volume sensor 17 is arranged on the filling pipe 12 and in the direction of the volume stream before the volume sensor 18 arranged at the outlet opening.

A flow speed sensor 1 is arranged at the highest point of the pressure pipe 19.

Figure 3:
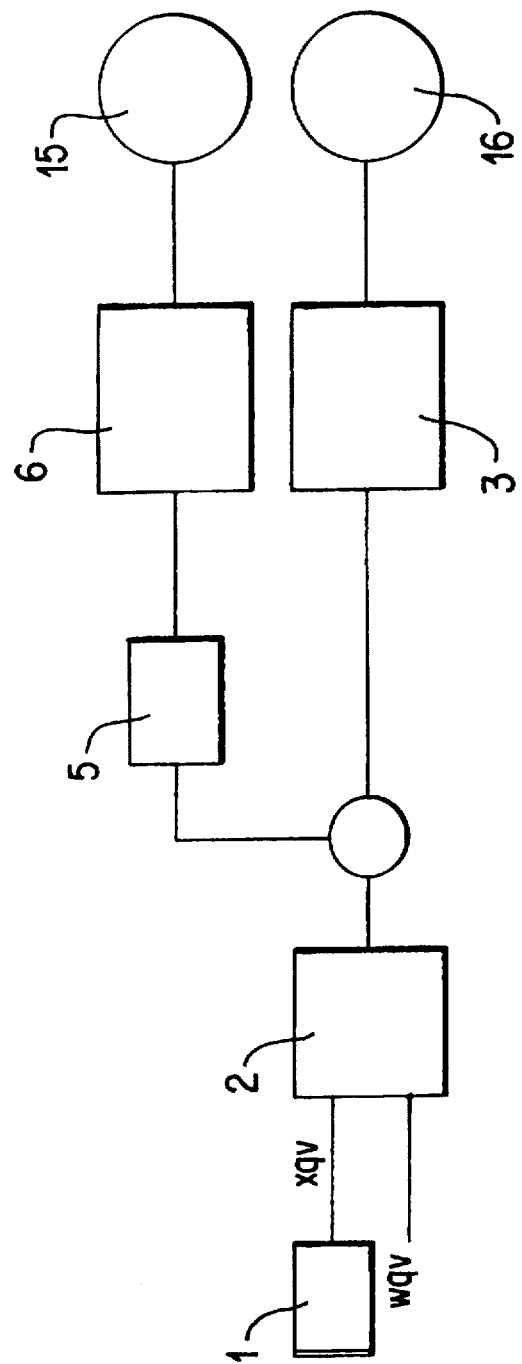

The outlet end of the rising filling pipe 12 is formed in such a way that the filling jet of the medium to be filled, flows freely and securely into the filling opening of the vessel to be filled, ensuring a clean filling without subsequent dripping, if the filling medium has a predetermined set speed at the outlet. The set speed is, depending on the medium, achieved with different speeds of the filling pump 15; 23, i.e. with various output frequencies of the frequency converter 10. The set speed for filling of i.e. 750 ml cans with latex binding agent is achieved at an output frequency of approx. 28 Hz. For filling the same size can with latex—white, an output frequency of approx. 38 Hz is required to achieved the same set speed. These values also depend on whether the paint has just been prepared and thoroughly stirred and at which storage temperature or how long the paint or filling medium has been stored. These are all influencing factors, which can only be compensated by an automatic adaptation of the pump speed to ensure that a stipulated set speed is reached. Otherwise it is necessary to manually adjust the speed of the filling jet before filling. This manual adjustment is time consuming and cannot prevent product losses from incorrect operation and inputs. Consequently the flow speed sensor 1 for measuring the flow speed Qv is, as shown in FIG. 3, arranged on the pressure pipe 19 as shown in FIG. 1. The sensor 1 continuously measures the flow speed Qv. The measuring value Xqv is entered into a Qv controller 2 as an actual value of the flow speeds Qv for comparison with a set value Wqv. In case of corresponding set and actual values no changes are carried out in a frequency converter 3 and no speed changes are carried out in the leveling pump drive 4.

In case that thee set and actual values differ, a voltage signal Uqv is issued to the frequency converter 3 as a regulated quantity of the Qv control and the speed of the leveling pump drive 4 is changed until the required flow speed at the volume sensor 17 has been set. The voltage output signal Uqv is then parameterized in amplifier 5, is output as a regulated quantity to the frequency converter FU 2, and becomes active at the filling pump drive 11 at the start of the filling. Speed changes during filling arm not permitted by the control program regime and frequency changes can only be carried out during the filling breaks. For this purpose, the steps of the procedures are set in such a way, that the leveling pump 16 generates for instance, a seed Xqv of 96 cm/s for a certain filling medium with a known viscosity and density. The determined set value, speed set value Wqv is 1.5 m/s.

As shown in FIG. 3, a voltage adjustment is carried out in the Qv regulator 2. For this purpose a voltage value of, for instance, 5V is output to the frequency converter FU 1 and the output frequency is increased to such an extent that the speed of the leveling pump 16 is increased to the required final speed of, for instance, 900 rpm. A measured voltage value of, for instance, 5V is parameterized in amplifier 5 and output to the frequency converter 6. The amplification or parameterization is required as the filling pipe 12 of the filling pump 15 has to cover a height of 30 to 50 cm up to the end of the filling pipe. The filling pump 15 also compensates for the apparent increase of the geodetic lifting height in the filling pipe 12 for liquids with higher densities, so that the required flow speed Qv is always maintained for filling. This compensation is required as for a chosen pump output and a known filling pipe cross section a volume flow Q of at least 1 l/s should be generated. The final speed of the filling pump drive 11 is reached after approx. 0.1 s at, for instance, the chosen frequency converter 6. The volume sensor 17 may only be activated when the filling pump 15 has safely reached the speed for the required set speed.

With the control of the medium flow speed and its adaptation to a set value, the following resulting procedural steps are apparent:

1. The speed and position of the filling jet are automatically regulated by the speed measurement, offering the filling of the filling medium into the container without subsequent dripping or splashing due to a continuously positioned filling jet.
2. The exactness of the filling is increased as the automatic speed control achieves a higher constancy of the level of the filling medium in the leveling container 14.
3. The system prevents incorrect fillings which could occur due to the incorrect manual input of values for the frequency converter 6.

According to FIG. 1, the leveling pump 16 is started after switching on the volume filling unit upon completion of the filling process of the buffer container 13. The volume flow generated by the leveling pump 16 fills the leveling container 14 arranged in the buffer container 13. The volume flow generated in the leveling pump 16 effects a continuous overflowing of the product to be filled on all sides of the leveling container 14 arranged in the buffer container 13. The leveling container 14 is arranged in such a way, that the product overflows on all sides. The distance to the limiting side walls of the buffer container 13 should not be less than 1 cm, to allow a free overflowing of the medium on all sides even in case of a higher viscosity. The volume flow generated by the leveling pump 16 is passed to the base of the leveling container 14 via a pressure pipe 19. The pressure pipe 19 contains an analogue speed sensor 1. The sensor 1 is able to measure flow speeds in the range of 0–300 cm/s. The speed sensor 1 continuously measures, as shown in FIG. 3, the actual value of the flow speed Xqv, which is compared with the stipulated flow speed set value Wqv in the Qv regulator 2. The measuring value Xqv is an analogue voltage value accepting voltages of 0–10V depending on the speed. All analogue voltages are assigned to a flow speed.

The leveling pump 16 generates for instance a speed Xqv of 96 cm/s for a certain filing medium with a known viscosity and density. The stipulated set value, set speed value Wqv is 1.5 m/s.

The voltage compensation is carried out as shown in FIG. 3, in the Qv regulator 2 through which a voltage value of, for instance, 5V is issued to the frequency converter FU 1 and the output frequency is increased to such an extent that the speed of the leveling pump 16 is increased to the required final speed of i.e. 900 rpm. A measured voltage value of, for instance, 5V is parameterized in the amplifier 5 and output to the frequency converter 6. The amplification or parameterization is required as the filling pipe 12 of the filling pump 15 has to cover a height of 30–50 cm up to the end of the filling pipe. The filling pump 15 also compensates the apparent increase of the geodetic lifting height in the filling pipe 12 for liquids with higher densities, so that the required flow speed Qv is always maintained for filling. This compensation is required as a volume flow Q of at least 1 l/s is generated for a chosen pump output and a known filling pipe cross section. The final speed of the filling pump drive 11 is reached after approx. 0.1 s at, for instance, the chosen frequency converter 6. The volume sensor 17 may only be activated when the filling pump 15 is safely operating in the range of the stationary flow. For this purpose, the volume sensor 17 is arranged in such a way over the filling level of the leveling container 14, that the measuring distance for the entire basic volume between the volume sensors 17; 18 is definitely only activated when it can be guaranteed that no speed change of the volume flow Q is going to take place.

The arrangement according to FIGS. 1 and 3 is selected for filling viscous filling medium with a shear ratio. Dispersions have a defined shear ratio. An example for this are latex binding agents. The viscosity, is in this case, decreased by agitation from an initial value of, for instance, 10 000 m Psc to a viscosity value of approx. 1 000 m Psc. If the agitation is stopped, the viscosity value rapidly increases again. The viscosity increases in the filling pump 15 during the filling breaks and the standstill of the pump runners. To prevent a viscosity rise, the pump runner of pumps 15; 16 is set directly after the pump standstill to a speed not transporting any medium.

The height difference of the filler material in the buffer container 13 between the leveling pump 16 and the overflow edge of the leveling container 14 in the buffer container 13 is low. The level difference between the leveling container 14 and the filler product level in the buffer container 13 is generally 2 to 3 cm. A higher volume flow Q can thus be generated with the same leveling pump 16 running at a lower speed.

When filling medium without a shear ratio, the overflow arrangement according to FIG. 1 is not required as no viscosity changes are caused by the agitation.

FIGS. 2 and 4 serve to explain the associated procedural system in more detail. According to FIG. 2, the filling pump 23 is arranged directly in the buffer container 21. The filling pipe 22 contains a speed sensor 8 and above it, in the rising direction of the volume flow, the volume sensors 17; 18.

As shown in FIG. 4 the flow speed sensor 8 measures the rise of the volume flow Q effected by the increase of the pump speed. The Qv regulator 9 compares the measured flow speed with the set value Wqv and the formed regulated quantity Uqv is directly output to the frequency converter 10 at the filling pump drive 11'. Upon reaching the set speed Wqv the output frequency of the frequency controller 10 is limited and consequently the pump speed is not increased. The distances between the sensor 8 measuring the flow speed and the volume sensor 17 are selected in such a way that the stationary flow is achieved after a set/actual value comparison and adjustment of the set value as well as a change of the pump speed, before the volume sensor 17 is activated. It should, however, be observed that a separate level control guarantees the maintenance of a constant level in the buffer container 21. This ensures, that a required filling speed is achieved and no level fluctuations which would cause a change of the flow speed Qv occur. The subsequent filling pump 23 generates a rising filling flow, measured by sensor 8. In case of a system without the volume sensor 17 and where the flow speed measured by sensor 8 is used for adjusting the pump speed, the pump speed is increased until the set/actual value comparison shows that the filling flow has reached the set speed, facilitating filling without subsequent dripping or splashing. The reached set value is stored, maintained and not changed. The analogue measuring value of the flow speed is changed into a flow-proportional pulse sequence. Speed fluctuations caused by small level changes in the filling container 13 are detected by a change of the pulse sequence and are automatically compensated. Upon the filler medium emerging from the filler head, the sensor 18 is triggered. This triggering signal is also the start signal for the volume measurement pulse counter. After counting the pulse sequence required for the set volume, the filling pump drive 11 is stopped.

Listing of Referential Characters Used

1 Speed sensor
2 Controller Qv
3 Frequency converter
4 Pump drive
5 Amplifier
6 Frequency converter
8 Speed sensor
9 Regulator
10 Frequency converter
11;1 1' Filling pump drive
12;2 2 Filling pipe
13;2 1 Buffer container
14 Level container
15;2 3 Filling pump
16 Level pump
17 Volume sensor
18 Volume sensor
19 Pressure pipe
20 Pump runner
Q Volume flow
Qv Flow sped
Xqv Actual value of the flow speed
Wqv Set value of the flow speed
Uqv Regulated quantity of the Qv control (voltage; 0 . . . 10V)
FU 1 Frequency converter of the leveling pump
M 1 Electronic drive of the leveling pump
FU 2 Frequency converter of the filling pump
M 2 Electronic drive of the filling pump

I claim:

1. A procedure for adjusting a filling jet of flow-controlled automatic filling machines, used for dosing liquids of various viscosities and densities and filling them with a free-flowing directed filling jet into vessels, in which liquid rises in a filling pipe between internal sensors, to determine a basic volume measured at intervals, which receives a consistent liquid quantity for a rising flow in the filling pipe due to the arrangement of an overflow from a leveling container and in which the time for filling the filling pipe is divided into time units commencing with a filling start and finishing upon medium emerging from the filling pipe, in which the basis for filling the volume of the filling pipe is kept constant by an overflow arrangement of the leveling container and a consistent measurement of the viscosity of the liquid and in which a filling pipe rises from the leveling container arranged in a buffer container, in which the leveling container and pumps are assigned to a mutual filling medium bath with the leveling container overflowing at all times to achieve a continuous circuit and a barrier formed by sensors at the rising end of the filling pipe being connected by a control signal to a control device provided by an output signal of a switching amplifier and having an amplified connection with a leveling pump, in which the control device is brought into an operative connection with a position sensor via a control signal and the leveling container in the buffer container offers the option to achieve a continuous circuit on a pressurized side with the leveling container and with the buffer container on a suction side and in which a filling volume is determined by two sensors arranged one above the other at a certain distance in the filling pipe and at the same time by a distance between the two sensors and a certain filling volume, characterized in that, a speed of the filling jet emerging from the filling pipe is determined and stored as a set value and an actual value of the speed of a volume flow emerging from a filling pump is measured by a speed sensor for comparison to adjust the speed of the emerging filling jet and with the output of the pump being changed until the stored set value of the filling jet speed at the volume sensor corresponds with the volume flow speed measured at the speed sensor and that only at this point the filling into the vessels is started.

2. A procedure according to claim 1, characterized in that, a continuous flow speed measurement of the volume flow emerging from the leveling pump is carried out whilst the filling medium bath is kept full and the leveling container overflowing at all times, with the volume flow being maintained at a constant level, that a sensor on the pressure pipe of the leveling pump continuously measures the existing speed Qv of the volume flow Xqv and compares this to an analogue value of the set speed and is output as a signal from the control to a frequency converter of the leveling pump drive to decrease or increase the speed of the leveling pump for changing the flow speed.

3. A procedure according to claim 1 or 2 characterized in that, the signal for changing the speed is passed to the frequency converter as an analogue signal.

4. A procedure according to claim 1 for dosing liquids of the same viscosity, in which the filling pump is inserted directly in the buffer container, operating without an intermediate arrangement of a leveling container, characterized in that, a level control in the buffer container and the maintenance of a constant filling level is achieved by a contactless speed sensor, continuously monitoring a filling level of the buffer container and passing the measured values to a set value comparison, triggering a control pulse in case of a deviation, used for adapting the pump speed, the flow quantity and speed to the set value.

5. A procedure according to claims 1 or 2 characterized in that, a control pulse is triggered after the determination of a value deviation of the volume flow and that the size of a valve opening is modified to change the filling level of the container.

6. A procedure according to one of claims 1, 2 and 4 characterized in that, the filling level of the buffer container is measured by a speed sensor arranged on the filling pipe and that the speed difference of the volume flow is brought into relation with the filling level of the container and adjusted.

7. A procedure according to one of claims 1, 4 and 6, characterized in that, a comparison of the measured value of the flow speed Qv and the set value Wqv is carried out with the sensor being an analogue speed sensor after measuring the flow speed Qv of the volume flow Q in an assigned analogue regulator, after which the regulated quantity Uqv is output as a continuous signal and the set value of the flow speed is adapted to maintain a constant speed of the pump drive.

8. A procedure according to claims 1 or 2 characterized in that, the liquid is continuously repumped between the buffer container and the leveling container in an adapted interval before the filling process and during the filling breaks to decrease the viscosity of liquids with a shear ratio and to maintain their constant viscosity.

9. A procedure according one of claims 1, 2 and 4, characterized in that, the pump drive of the buffer container filling pump is activated and kept moving without pumping, in order to maintain a constant viscosity in case of a final value of the shear ratio of a liquid being available.

* * * * *